(12) United States Patent
Rai et al.

(10) Patent No.: US 9,665,794 B2
(45) Date of Patent: May 30, 2017

(54) METHODS AND SYSTEMS FOR ENABLING VISION BASED INVENTORY MANAGEMENT

(71) Applicant: Infosys Limited, Bangalore (IN)

(72) Inventors: Harikrishna Gandhinagara Narayana Rai, Bangalore (IN); Krishnamurthy Sai Deepak, Bangalore (IN); Radha Krishna Pisipati, Hyderabad (IN)

(73) Assignee: Infosys Limited, Bangalore (IN)

( * ) Notice: Subject to any disclaimer, the term of this patent is extended or adjusted under 35 U.S.C. 154(b) by 665 days.

(21) Appl. No.: 13/945,403

(22) Filed: Jul. 18, 2013

(65) Prior Publication Data

US 2014/0023276 A1   Jan. 23, 2014
US 2016/0224865 A9   Aug. 4, 2016

(30) Foreign Application Priority Data

Jul. 19, 2012   (IN) .......................... 2946/CHE/2012

(51) Int. Cl.
  *G06K 9/62*   (2006.01)
  *G06K 9/22*   (2006.01)

(52) U.S. Cl.
  CPC ........... *G06K 9/6202* (2013.01); *G06K 9/228* (2013.01)

(58) Field of Classification Search
  CPC ........... G06F 17/30256; G06F 17/3025; G06F 17/30259; G06F 17/30262; G06F 17/30247; G06F 17/30477; G06F 17/3053; G06F 17/30825; G06K 9/46; G06Q 30/0601; G06Q 20/203; G06Q 10/087; G06Q 10/08; G06Q 10/0875; G06T 7/001; G06T 2207/30108; G06T 7/0008; G06T 7/0004

USPC ................................. 382/141, 152, 190, 209
See application file for complete search history.

(56) References Cited

U.S. PATENT DOCUMENTS

| | | |
|---|---|---|
| 2003/0154141 A1 | 8/2003 | Capazario et al. |
| 2005/0137943 A1 | 6/2005 | Holzman |
| 2007/0124216 A1* | 5/2007 | Lucas .................. G06Q 10/087 705/26.1 |
| 2008/0152231 A1* | 6/2008 | Gokturk et al. .............. 382/209 |
| 2010/0046791 A1 | 2/2010 | Glickman et al. |
| 2010/0092093 A1* | 4/2010 | Akatsuka et al. ............ 382/203 |
| 2010/0182450 A1* | 7/2010 | Kumar et al. ............. 348/229.1 |

(Continued)

OTHER PUBLICATIONS

U.S. Appl. No. 61/541,970, Bhardwaj et al., filed Sep. 30, 2011.*
U.S. Appl. No. 61/554,890, Bhardwaj et al., filed Nov. 2, 2011.*

*Primary Examiner* — Kim Vu
*Assistant Examiner* — Michael Vanchy, Jr.
(74) *Attorney, Agent, or Firm* — Klarquist Sparkman, LLP

(57) ABSTRACT

Embodiments of the present invention relate to an inventory management method and system. The present invention addresses the foregoing need of an inventory management system through which all size and shape of components can tracked before and after an assembly process in a manufacturing facility. The invention address the challenges faced by store keeping clerks in locating the position of excess components returned from assembly floor, which are taken in excess but not being utilized during assembly process. Since basic spare parts which are smaller in size but taken in large quantity from store room due to their frequent usage, excess components needs to be kept back in store keeping units for effective inventory management.

33 Claims, 3 Drawing Sheets

(56) References Cited

U.S. PATENT DOCUMENTS

2013/0084002 A1* 4/2013 Bhardwaj .......... G06Q 30/0643
382/165

* cited by examiner

METHODS AND SYSTEMS FOR ENABLING VISION BASED INVENTORY MANAGEMENT

RELATED APPLICATION DATA

This application claims priority to India Patent Application No. 2946/CHE/2012, filed Jul. 19, 2012, the disclosure of which is hereby incorporated by reference in its entirety.

FIELD OF THE INVENTION

The invention relates generally to a method and system for inventory management. In particular, it relates to a method and system for locating the position of components in store keeping unit for computer assisted inventory placement and auditing in manufacturing plant.

BACKGROUND

To run a manufacturing unit successfully, it is important for companies to have a detailed, up-to-date record of their inventory. With the advent of computers, inputting and tracking inventories become easier by inventory management software and systems. For effective inventory management major technologies used are bar codes and RFID. One known bar code technique uses unique bar code patterns for each component and these codes are mapped to component details such as make, model number, location details in a computer system. Using a bar code reader, a storeroom clerk captures the barcode of the component and the details of that component are retrieved from the system.

RFID technology is another alternate technology widely used for component and asset tracking in industries. RFID based solutions have several advantages over manual bar code based component location tracking, RFID systems are cheaper, fast, more secure and reliable. Another major advantage is that there is no need of line-of-sight for detecting a component in the RFID based location-tracking systems. Hence, even if components are in larger heaps without direct visibility to human eyes, RFID systems can still detect the components using embedded sensors. In this system, RFID tags are fitted with the component to be located. These systems contain RFID tags, which are radio frequency transmitters comprising a microchip and antenna and a tiny battery. RFID receiver detects the RF signals emitted by each tag and interprets the encoded identification details.

One major limitation of above barcode and RFID based technology is that they are not appropriate for locating the position of small components like screws, bolts, nails, pins, etc. as they may not have enough surface area to attach a bar code or a RFID tag. In addition to this, these basic components are used in large quantity and it becomes a tedious task to attach a bar code or RFID tag with each component while archiving in storeroom.

One solution to solve above problem is by collecting all smaller items in one container and attaching the bar code to container, but this also time consuming and may not help in identifying the components once brought outside the container.

SUMMARY

The present invention addresses the foregoing need of an inventory management system through which all size and shape of components can tracked before and after an assembly process in a manufacturing facility.

The invention address the challenges faced by store keeping clerks in locating the position of excess components returned from assembly floor, which are taken in excess but not being utilized during assembly process. Since basic spare parts which are smaller in size but taken in large quantity from store room due to their frequent usage, excess components needs to be kept back in store keeping units for effective inventory management.

The invention recites a method for identifying a component location in an inventory. The first method step is capturing images of the components and then selecting a component from the images of the components. The next method step is extracting features of the selected component and comparing the features of the selected component with the entries of a database. Then displaying a plurality of components from the database wherein at least one feature of the plurality of components is identical to the features of the selected component and selecting another component from the plurality of components that is identical to the previously selected component.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that systems and methods for inventory management are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention which is known to the inventors at the time of filing the patent application.

The present invention relates to methods and systems for inventory management.

According to one preferred embodiment, an inventory management system is provided. This embodiment aids in managing the excess components that are left after an assembly process in a manufacturing unit. It helps a storekeeper to locate the store-keeping unit (SKU) for each component left at the assembly area and updates the database accordingly; thereby the store keeping process becomes easy and highly efficient.

Figure 1:
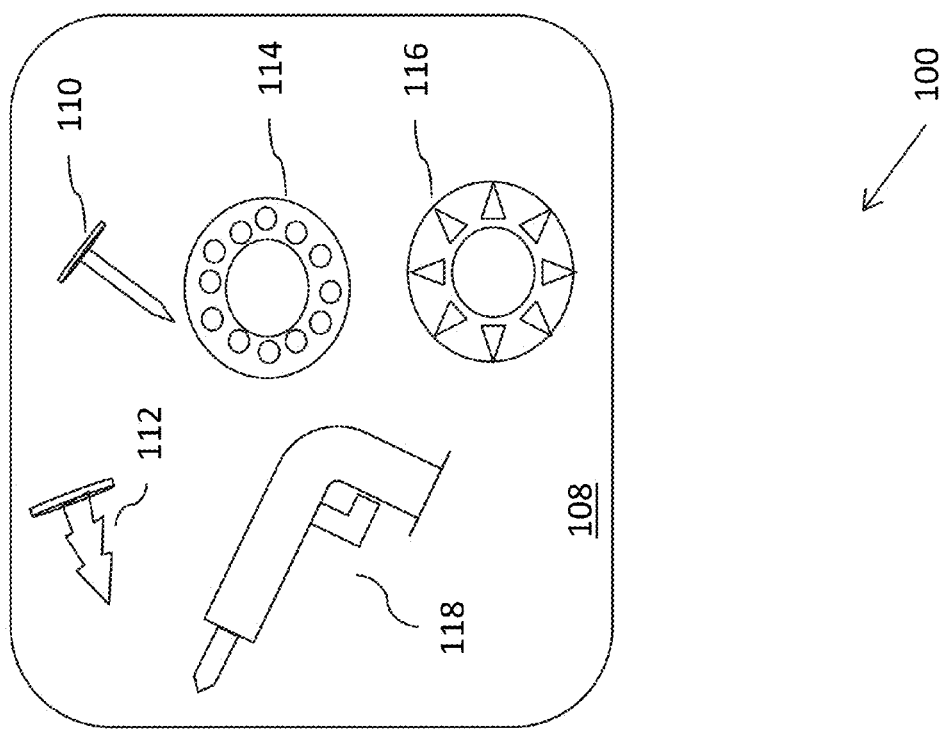
FIG. 1 is an illustrative diagram of an environment for the inventory management, in accordance with a described embodiment.
Figure 1:
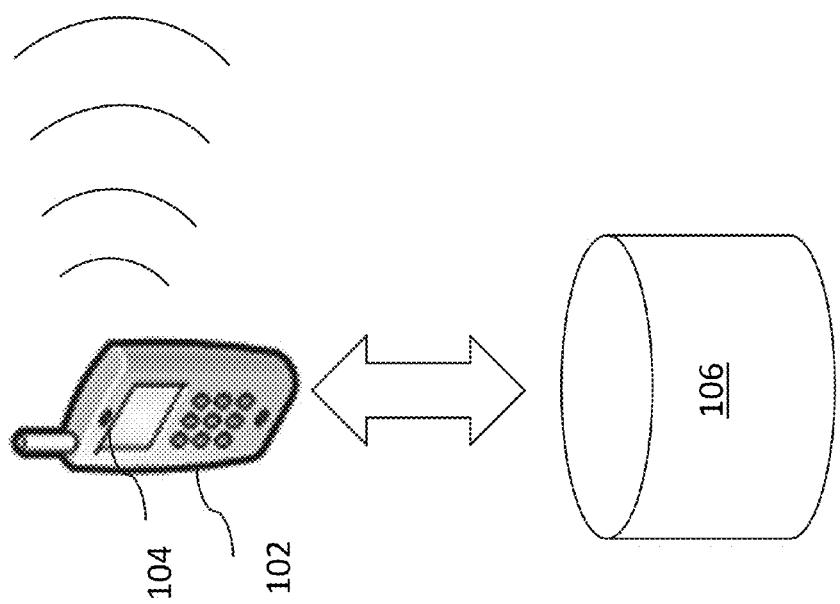

FIG. 1 is an illustrative diagram of an environment for the inventory management, in accordance with a described embodiment. The environment 100 shown in FIG. 1 comprising a handheld device 102, assembly area 108 and a database unit 106, in operable communication with the handheld device 102, is depicted. There are multiple components are present at the assembly area 108. The components include a nail 110, a screw 112, a first bearing 114, a second bearing 116 and a driller 118. It is apparent to those of ordinary skill in the art that the components illustrated at assembly area 108 in FIG. 1 is for exemplary purpose only and may include various components, parts, tools, items, assets of various size, shape, weight, or color.

The handheld device 102 includes an imaging device 104, which is capable of capturing still and/or moving images of the assembly area 108. The handheld device 102 can be a cellular phone, laptop, tablet, or any other mobile device with a camera. The database unit 106 as shown in FIG. 1 is in connection with the handheld device 102 and is capable of sending data to and/or receiving data from the handheld device. The database unit 106 is connected through, either a local area network (LAN), wide area network (WAN), wireless arrangements, or Internet with the handheld device 102. The database unit 106 contains data of all the available components, parts, tools items, assets etc. in the manufacturing unit. Data stored in the database unit 106 includes the name, image, size, shape, texture, color, weight, available quantity and location of each component, part or tool in a tabular form. The handheld device 102 can retrieve data from the database 106 and is capable of updating the information related to the availability of any component stored in the database unit 106.

Figure 2:
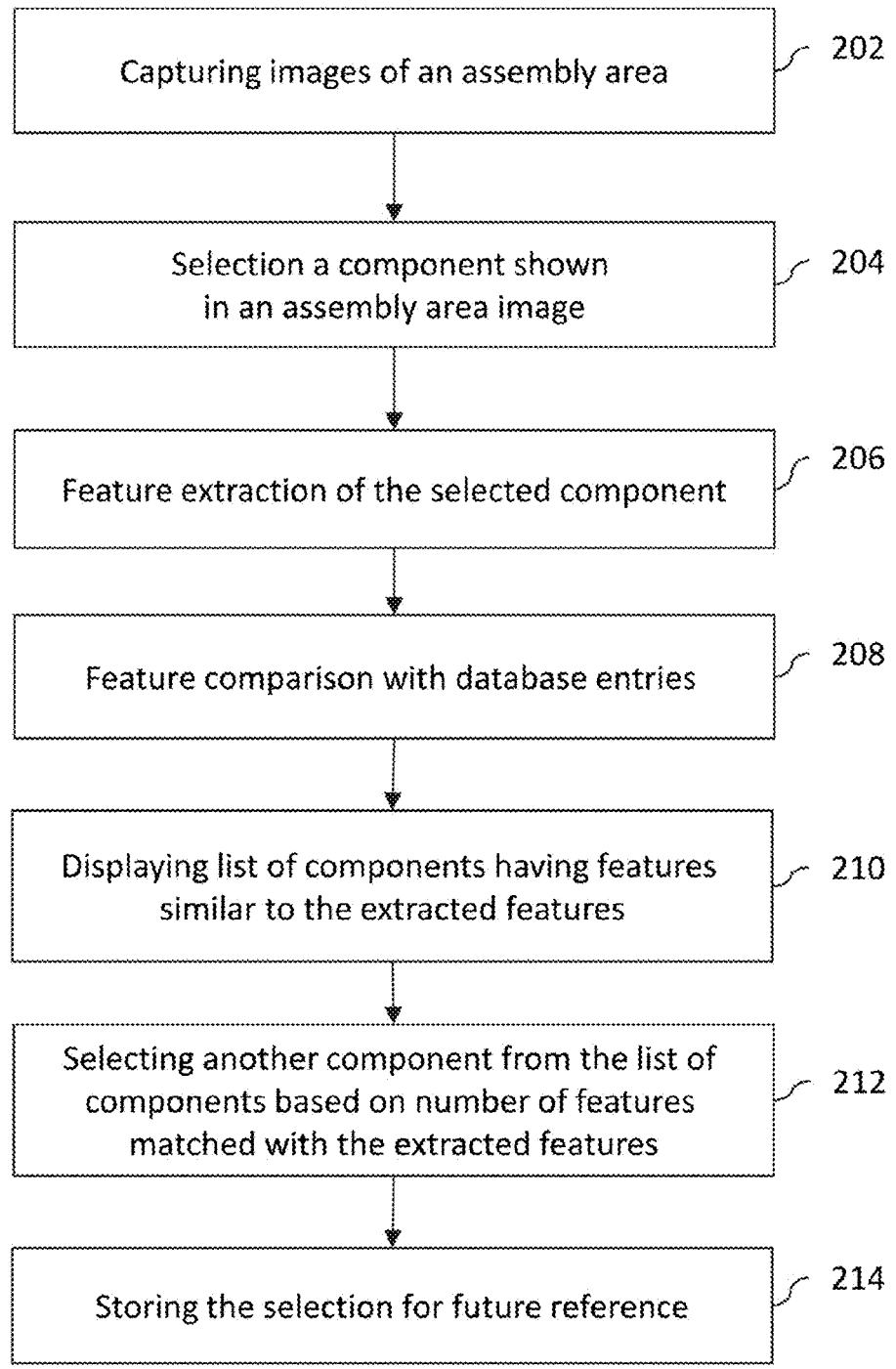
FIG. 2 is a diagram depicting a method for managing components in an inventory, in accordance with a described embodiment of the present invention.

FIG. 2 is an illustrative flowchart for managing components in an inventory, in accordance with some embodiments. In the manufacturing unit after the assembly process completed some left overs such as components, tools, parts, items, assets etc. remains at the product assembly area 108 as shown in FIG. 1. At the first step 202, the handheld device 102 shown in FIG. 1 captures multiple images of the assembly area 108 using the imaging device 104. The images include all the components left over the assembly area 108. The handheld device 102 is capable of processing the images and displaying the processed images to a user. At step 204, the handheld device 102 selects a component, part or tool from the image displayed to the user. The selection of the component could be done based on a predefined selection algorithm or it could be a random selection. A person skilled in the art will appreciate that the user can also do the selection of the component displayed by the handheld device. The handheld device 102 extracts various features of the selected component at the next method step 206. The extracted component features may include at least one of color, shape, size, weight, texture, dimensions, etc. The component feature extraction could be performed by using various image recognition techniques well known in the art. At step 208, the system compares extracted features of the selected component with the data stored in the database unit 106 as shown in FIG. 1. The system can compare either all the features or some of the features of the selected component with the database 106 entries. A person ordinarily skilled in the art will appreciate that the user can select the extracted feature of the selected component for the comparison with the database entries. At the next step 210, the handheld device 102 displays a list of components data stored in the database unit 106 that appears to be similar to the selected components based on the comparison performed at step 208. The component list displayed on the handheld device 102 includes component name, image, color, texture, shape, size, quantity, location etc. The displayed list is in a chronological order i.e. the components having maximum number of features similar to the features extracted from the selected component will appear at the top of the list. The list of the components could also be displayed in alphabetical order, an ascending or descending order based on the available quantity or in any other order preferred by the user. At method step 212, a component is selected from the component list displayed on the handheld device 102. The component is selected by the handheld device 102 either based on the number of features matched with the features extracted from the component selected previously from the image data or on the bases of a historical event. The historical event is an event stored in the database 106 based on a component selection done by the user previously. The user could also select the component from the component list displayed on the handheld device 102. If the user does the selection of the component from the displayed list, the selection information gets stored in the database unit 106 as historical event for future reference at step 214. Based on the selection done at method step 212 the user find outs the exact location in a storeroom of the manufacturing unit of the component selected from the image data of the assembly area 106. By following the method steps show in FIG. 2 and described above the user can easily and efficiently identify the location of all the left overs at the assembly area in the storeroom of the manufacturing unit irrespective to the size, shape, color or texture of the components.

Figure 3:
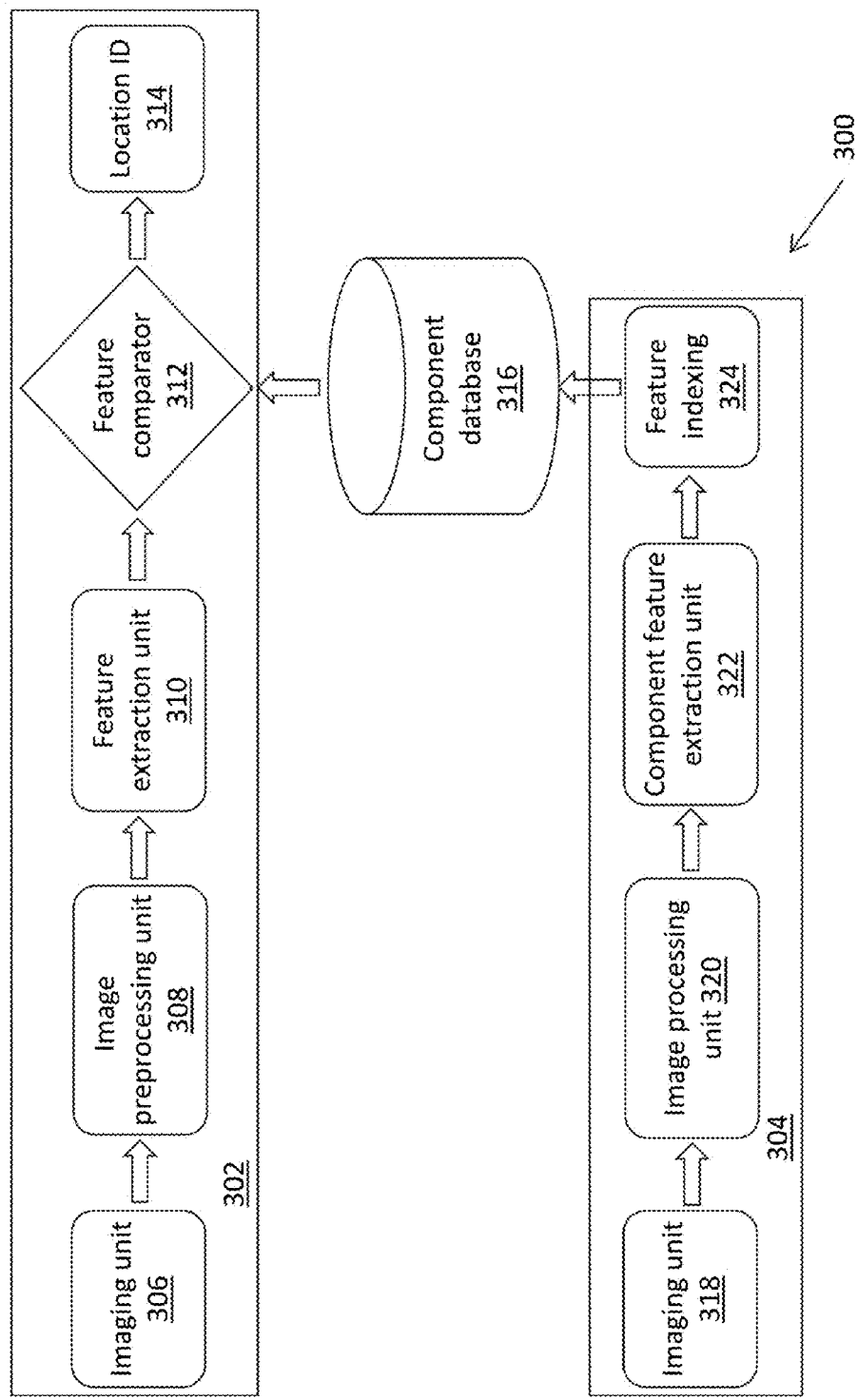
FIG. 3 is an illustrative schematic diagram of a system for inventory management, in accordance with a described embodiment of the present invention.

FIG. 3 is an illustrative schematic diagram of an inventory management system 300, in accordance with a described embodiment of the present invention. The inventory management system 300 includes a component search module 302, component indexing module 304 and a component database 316.

The component search module 302 further includes an imaging unit 306, an image-preprocessing unit 308, a feature extraction unit 310, a feature comparator 312 and location ID unit 314. The imaging unit 306 is used for capturing images of the area where various components, parts or tools are present such as assembly area 108 shown in FIG. 1. The imaging unit 306 could be a mobile phone camera, video camera, still camera, webcam, or any other type of image capturing device. The imaging unit 306 is connected to the image-preprocessing unit 308. The image-preprocessing unit 308 is used to check the quality of the image based on various quality parameters captured by the imaging unit 306. It quality parameters includes ambient light of the scene, brightness value in the captures image, field of view of the imaging device etc. when the image-prepressing unit 308 receives captured image from the imaging unit 306, it compares the quality parameters values of the captures image with a pre-define minimum quality parameter values stored in the prepossessing unit 308. If any of the quality parameter value of the captured image is lesser than the pre-stored value of the quality parameter value then the preprocessing unit 308 either rejects the image or prompts an alert message to the user. Once an image captured by the imaging unit 306 passes all the quality parameters checks done by the preprocessing unit 308, it sends the image to the feature extraction unit 310. In the feature extraction unit 310, a component of interest is being selected from the components present in the image either using a pre-defined algorithm stored in the component search module or by the user. The method steps followed by the feature extraction unit 310 for the selection of the component of interest are same as step 204 and step 206 of FIG. 2 explained earlier. Another function of the feature extraction unit 310 is to extract features of the component of the interest. The features extracted from the component may include color, shape, texture, size, etc. The extracted features of the component send to the feature comparator 312 as shown in FIG. 3. The comparator 312 compares the extracted features with the data entries present in the component database 316. The component database 316 contains data of all the available components, parts, tools etc. in the manufacturing unit. Data entries in the component database 316 includes the name, image, size, shape, texture, color, weight, available quantity and location ID of each component, part or tool. The location ID of a component is the location in the storeroom of the manufacturing unit where a similar kind of components is stored. The comparator 312 extract a list of components from the database 316 based on the comparison of the extracted features of the component in interest with database entries. The extracted list is displayed on the handheld device 102 as shown in FIG. 1. Then the location ID unit 314 selects a component that is same as the component of interest from the component list extracted by the feature comparator 312 by following the method recited earlier at step 212 of FIG. 2. If the user does the selection of the component from the extracted list then the selection is considered, as historical event and it get stored in the database 316 for future reference. The location ID associated with the component selected by the location ID unit 314 from the extracted list is presented to the user as the location information of the component of interest.

Function of the component indexing module 304 is to create and update the database 316 that can in turn used for locating the location ID of any component by the component search module 302. The indexing module 304 includes an imaging unit 318, an image-processing unit 320, a component feature extraction unit 322 and a feature-indexing unit 324. The imaging unit 318 is similar to the imaging unit 306 and is used for capturing images of the individual components, parts and tools available in the storeroom of the manufacturing unit. Component images should be capture in the predetermined background, with as many angles as possible and with the best camera settings captured by the imaging device 318 for good and precise visibility of the components. The images of the individual components, parts and tools are sent image-processing unit 320 for further processing. The image-processing unit 320 removes noise and enhances the image quality using image-processing techniques known in the art. The processed images from processing unit 320 are sent to the component feature extraction unit 322. The extraction unit 322 extracts the features of the component present in the image received from the processing unit 320. The features extracted by the extraction unit 322 include color, texture, size, and shape. The next functional block is feature-indexing unit 324 receives the extracted features from the extraction unit 322 and store the feature details along with the image of each component in the component database 316. A user can enter the component name, available quantity in the storeroom and the location ID information for each component stored by the indexing unit 322 in the database 316. A means for inputting component name, available quantity and the location ID information user input means are provided with the database 316. The user can also input one or more comments related to the component present in the image. The comments may include an observation stating a defect in the component, a command related to use of the component, a new type of component entry in the existing database entries and so on. A person skilled in the art will appreciate that the user input means can also be provided along with the indexing unit 322 and the user can add information of each component along with the extracted features and component images that in turns stored as an individual component file in the database 316 by the indexing unit 322. As recited, the component indexing module 304 create and maintain the component database 316 for the component search module 302 by storing information of the available and newly arrived components in the storeroom.

Embodiments of the present invention enable faster, easier, more efficient and less tiring usage of inventory management. The present invention is applicable for all types, shape, and size of components; hence, it eliminates the size dependency limitation from the inventory management system.

The present description includes the best presently contemplated method for carrying out the present invention. Various modifications to the embodiments will be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

What is claimed is:

1. A method for identifying a component location in an inventory, the method comprising:
    capturing at least one image of a workspace in which one or more components are present, wherein the one or more components appear in the at least one image;
    selecting a first component of the one or more components from the at least one image of the workspace; and
    determining an inventory location corresponding to the first component from the at least one image of the workspace, the determining comprising:
        extracting one or more features of the first component;
        comparing the one or more features of the first component with entries in a database for a component inventory;
        displaying a list of one or more of the entries in the database for components in the component inventory that have at least one feature similar to at least one of the one or more features of the first component, the list including, for the respective entries, a location within the component inventory where the corresponding component is stored; and selecting a second component from the list, wherein the second component matches the first component, and wherein an inventory location of the second component is the inventory location corresponding to the first component.

2. The method as claimed in claim 1 further comprising prompting an alert message before capturing at least one image of the workspace if a value of one or more image quality parameters is below a predefined value of the one or more image quality parameters.

3. The method as claimed in claim 2, wherein the one or more image quality parameters comprise at least one of ambient light, brightness or field of view of an image-capturing device.

4. The method as claimed in claim 1, wherein selecting the first component of the one or more components from the at least one image of the workspace comprises selecting the component based on a user input.

5. The method as claimed in claim 1, wherein selecting the first component of the one or more components from the at least one image of the workspace comprises selecting the component using one or more selection algorithms.

6. The method as claimed in claim 1 wherein extracting the one or more features of the first component comprises extracting the one or more features using one or more image recognition techniques.

7. The method as claimed in claim 1 wherein the one or more features comprise one or more of a size, a shape, a color or a texture of the first component.

8. The method as claimed in claim 1 wherein comparing the one or more features of the first component comprises selecting at least one feature of the first component for comparison.

9. The method as claimed in claim 8 wherein selecting at least one feature of the first component comprises selecting at least one feature based on a user input.

10. The method as claimed in claim 8 wherein selecting at least one feature of the first component comprises selecting at least one feature based on a historical event.

11. The method as claimed in claim 1, wherein the respective entries of the database comprise one or more of name, image, location information, type, color, size, texture, shape, unit ID, quantity or use.

12. The method as claimed in claim 1, wherein displaying the list further comprises, for the respective entries, displaying one or more of name, image, type, color, size, texture, shape, unit ID, quantity or use.

13. The method as claimed in claim 1 wherein selecting the second component comprises selecting the second component based on a user input.

14. The method as claimed in claim 1 wherein selecting the second component comprises selecting the second component based on a historical event.

15. The method as claimed in claim 1 wherein selecting the second component further comprises storing the second component selection as a historical event.

16. A system for identifying a component location in an inventory, the system comprising:
a handheld device configured to capture at least one image of a work area containing one or more components;
a first selection module configured to select a first component of the one or more components from the at least one image of the work area;
a processor configured to extract one or more features of the first component;
a comparison module configured to compare the one or more features of the first component with entries of a database for a component inventory, the database being linked with the handheld device, and the respective entries corresponding to components in the component inventory;
a display configured to list one or more of the entries corresponding to components in the component inventory that have at least one feature similar to at least one of the extracted features of the first component selected from the at least one image of the work area, the list including a location of the corresponding components within the component inventory; and
a second selection module configured to select a second component from the list, wherein the second component matches the first component, and wherein the location of the second component within the component inventory is an inventory location for the first component.

17. The system as claimed in claim 16, further comprising an alarm configured to prompt an alert message before capturing at least one image of the work area if a value of one or more image quality parameters is below a predefined value of the one or more image quality parameters.

18. The system as claimed in claim 16, wherein the first selection module further comprises a user input module configured to select the first component from the at least one image of the work area.

19. The system as claimed in claim 16, wherein the first selection module further comprises a selection module configured to execute one or more selection algorithms configured to select the first component from the at least one image of the work area.

20. The system as claimed in claim 16, further comprising an image recognition module.

21. The system as claimed in claim 16 wherein the comparison module configured to compare the one or more features of the first component comprises a third selection module configured to select at least one feature of the first component for comparison.

22. The system as claimed in claim 21 wherein the third selection module further comprises a user input module configured to select at least one feature of the first component.

23. The system as claimed in claim 16 wherein the second selection module comprises a user input module configured to select the second component.

24. The system as claimed in claim 16 wherein the second selection module comprises a memory element configured to store the second component selection as a historical event.

25. A non-transitory computer-readable medium having computer-readable code stored thereon that, when executed by one or more computing devices, causes the one or more computing devices to:
capture at least one image of a workspace, wherein one or more components in the workspace are part of the at least one image;
select a first component from the one or more components in the workspace;
extract one or more features of the first component;
compare the one or more features of the first component with entries of a database, each of the entries corresponding to a component in an inventory;
display a list of one or more of the entries corresponding to components in the inventory that have at least one feature similar to at least one of the extracted features of the first component selected from the one or more components in the workspace, the list including a location of the corresponding components within the inventory; and select a second component from the list, wherein the second component matches the first component, and wherein the location of the second component within the inventory is an inventory location for the first component.

26. The non-transitory computer-readable medium as claimed in claim 25, the computer-readable code further causing the one or more computing devices to prompt an alert message before capturing at least one image of the workspace if a value of one or more image quality parameters is below a predefined value of the one or more image quality parameters.

27. The non-transitory computer-readable medium as claimed in claim 25, wherein the selection of the first component comprises receiving a user input for selecting the first component from the at least one image of the workspace.

28. The non-transitory computer-readable medium as claimed in claim 25, wherein the selection of the first component from the at least one image of the workspace is performed by executing one or more selection algorithms.

29. The non-transitory computer-readable medium as claimed in claim 25 wherein the extraction of the one or more features of the first component uses one or more image recognition techniques.

30. The non-transitory computer-readable medium as claimed in claim 25 wherein the comparison of the one or more features of the first component comprises selecting at least one feature of the first component for comparison.

31. The non-transitory computer-readable medium as claimed in claim 30 wherein the selection of the at least one feature of the first component for comparison further comprises receiving a user input for selecting at least one feature of the first component.

32. The non-transitory computer-readable medium as claimed in claim 25, wherein the selection of the second component comprises receiving a user input for selecting the second component.

33. The non-transitory computer-readable medium as claimed in claim 25, wherein the selection of the second component comprises storing the second component selection as a historical event.

* * * * *